US011119331B2

(12) United States Patent
Chapman et al.

(10) Patent No.: US 11,119,331 B2
(45) Date of Patent: Sep. 14, 2021

(54) METHOD FOR DAMPENING PROJECTOR VIBRATION

(71) Applicant: Disney Enterprises, Inc., Burbank, CA (US)

(72) Inventors: Steven M. Chapman, Burbank, CA (US); Joseph Popp, Burbank, CA (US); Joseph Hager, Burbank, CA (US); Mehul Patel, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 237 days.

(21) Appl. No.: 15/939,036

(22) Filed: Mar. 28, 2018

(65) Prior Publication Data
US 2019/0302472 A1 Oct. 3, 2019

(51) Int. Cl.
G02B 27/64 (2006.01)

(52) U.S. Cl.
CPC .... *G02B 27/646* (2013.01); *G03B 2205/0015* (2013.01)

(58) Field of Classification Search
CPC .... G02B 27/64; G02B 27/646; G03B 21/145; H04N 5/21; H04N 5/57; H04N 5/66; H04N 5/74; H04N 9/3173; H04N 9/3179; H04N 9/3185; H04N 9/3194
USPC ................................................. 359/554–557
See application file for complete search history.

(56) References Cited

U.S. PATENT DOCUMENTS

| | | | | |
|---|---|---|---|---|
| 7,771,058 B2* | 8/2010 | Wakita | ..... | G02B 7/28 353/122 |
| 8,919,965 B2* | 12/2014 | Bowen | ..... | H04N 9/3173 353/70 |
| 9,638,989 B2* | 5/2017 | Marti | ..... | H04N 9/3185 |
| 2004/0201707 A1* | 10/2004 | Noguchi | ..... | G02B 15/173 348/208.7 |
| 2006/0103811 A1* | 5/2006 | May | ..... | H04N 5/74 353/69 |
| 2006/0146015 A1* | 7/2006 | Buchmann | ..... | H04N 9/3185 345/156 |
| 2010/0259627 A1* | 10/2010 | Trumbull | ..... | H04N 5/232 348/208.4 |
| 2012/0026329 A1* | 2/2012 | Vorobiev | ..... | G01C 21/12 348/148 |

(Continued)

*Primary Examiner* — Thong Q Nguyen
(74) *Attorney, Agent, or Firm* — Dorsey & Whitney LLP

(57) ABSTRACT

The disclosure is directed toward stabilizing an image projected by a projector in an environment including vibrations or other movements that displace the projected image. In one set of implementations, an image projected by a projector may be stabilized by using an image stabilization system that detects a displacement of the projector from an equilibrium position and controls an optical element of the projector to offset the displacement. In an additional set of implementations, an image projected by the projector may be stabilized by using an image stabilization system that measures a rate of displacement from equilibrium of an image projected by the projector to predict a displacement of the projector and counteract the predicted displacement. In another set of implementations, an image projected by a projector may be stabilized by precalculating a plurality of lookup tables that correct for displacements of the projected image during operation of the projector.

25 Claims, 13 Drawing Sheets

(56) References Cited

U.S. PATENT DOCUMENTS

2012/0133837 A1\* 5/2012 Furukawa ........ H04N 21/41415
    348/607
2016/0246061 A1\* 8/2016 Bickerstaff ........ H04N 5/23258
2016/0247321 A1\* 8/2016 Wong ....................... G06F 3/017
2016/0261806 A1\* 9/2016 Honjo ................ H04N 5/23209
2017/0169540 A1\* 6/2017 Satori .................. H04N 21/278

\* cited by examiner

METHOD FOR DAMPENING PROJECTOR VIBRATION

BRIEF SUMMARY OF THE DISCLOSURE

The disclosure describes improved systems and methods for eliminating or mitigating vibrations or other unwanted movements introduced into a projector.

In one example, a system includes: an image stabilization system, including: one or more motion sensors to measure a total displacement or displacement rate of an image projected by a projector from an equilibrium position; and a processing unit to cause one or more actuators of the projector to actuate an optical element of the projector to stabilize the projected image, where the optical element is actuated using at least the measured total displacement or displacement rate. In some implementations, the system also includes the projector, and the projector includes: a light source; one or more optical elements to structure light emitted by the light source to create the image; and a projection lens to project the image. In implementations, the projector includes the image stabilization system and/or the motion sensors.

In some implementations, the one or more motion sensors are to measure the total displacement of the projected image from equilibrium, and the optical element is actuated using at least the measured total displacement.

In some implementations, the system includes: a memory storing a plurality of lookup tables, each of the plurality of lookup tables configured to correct a respective displacement or displacement range of a projected image, where the processing unit causes the one or more actuators to actuate the optical element using at least a lookup table corresponding to the measured total displacement.

In some implementations, the one or more actuators include a motor to actuate the projection lens to correct for the measured displacement of the projected image.

In some implementations, the projector is a digital light processing (DLP) projector including a digital micromirror device (DMD) chip comprising a plurality of mirrors, where processing unit causes the one or more actuators are to actuate the plurality of mirrors to correct for the measured displacement of the projected image.

In some implementations, the projector is a liquid crystal display (LCD) projector including an LCD panel, where the processing unit causes the one or more actuators to actuate the LCD panel to correct for the measured total displacement of the projected image.

In some implementations, the projector is a liquid crystal on silicon (LCoS) projector including a LCoS microdevice, where the processing unit causes the one or more actuators to actuate the LCoS microdevice to correct for the measured total displacement of the projected image.

In some implementations, the image stabilization system is a three-axis image stabilization system, where the one or more motion sensors measure displacement of the projected image in three axes.

In some implementations, the one or more motion sensors are to measure the rate of displacement of the projected image from equilibrium, and the processing unit causes the one or more actuators to actuate the optical element of the projector to correct for a predicted displacement of the projected image using at least the measured rate of displacement.

In some implementations, the one or more motion sensors are to measure the total displacement and the rate of displacement of the projected image from equilibrium, and the processing unit causes the one or more actuators to actuate the optical element of the projector to correct for a predicted displacement of the projected image using at least the measured rate of displacement and measured total displacement.

In another example, a method includes: using one or more motion sensors to measure a total displacement from an equilibrium position of an image projected by a projector; using at the least the measured total displacement, determining an actuation of an optical element of the projector to stabilize the image; and stabilizing the projected image by actuating the optical element. In some implementations, the optical element is actuated based on a precalculated lookup table associated with a map to correct for the measured total displacement, where the lookup table is stored in a memory of the projector.

In some implementations, the method further includes: storing a plurality of lookup tables in a memory of the projector, each of the plurality of lookup tables associated with a map to correct a respective displacement or displacement range of a projected image.

In some implementations, the method further includes: determining if the measured total displacement exceeds a predetermined threshold.

In another example, a method includes: using one or more motion sensors to measure a rate of displacement from an equilibrium position of an image projected by a projector; using at the least the measured rate of displacement, estimating an actuation of an optical element of the projector to maintain a stabilized image; and actuating the optical element based on the estimated actuation.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

Figure 1:
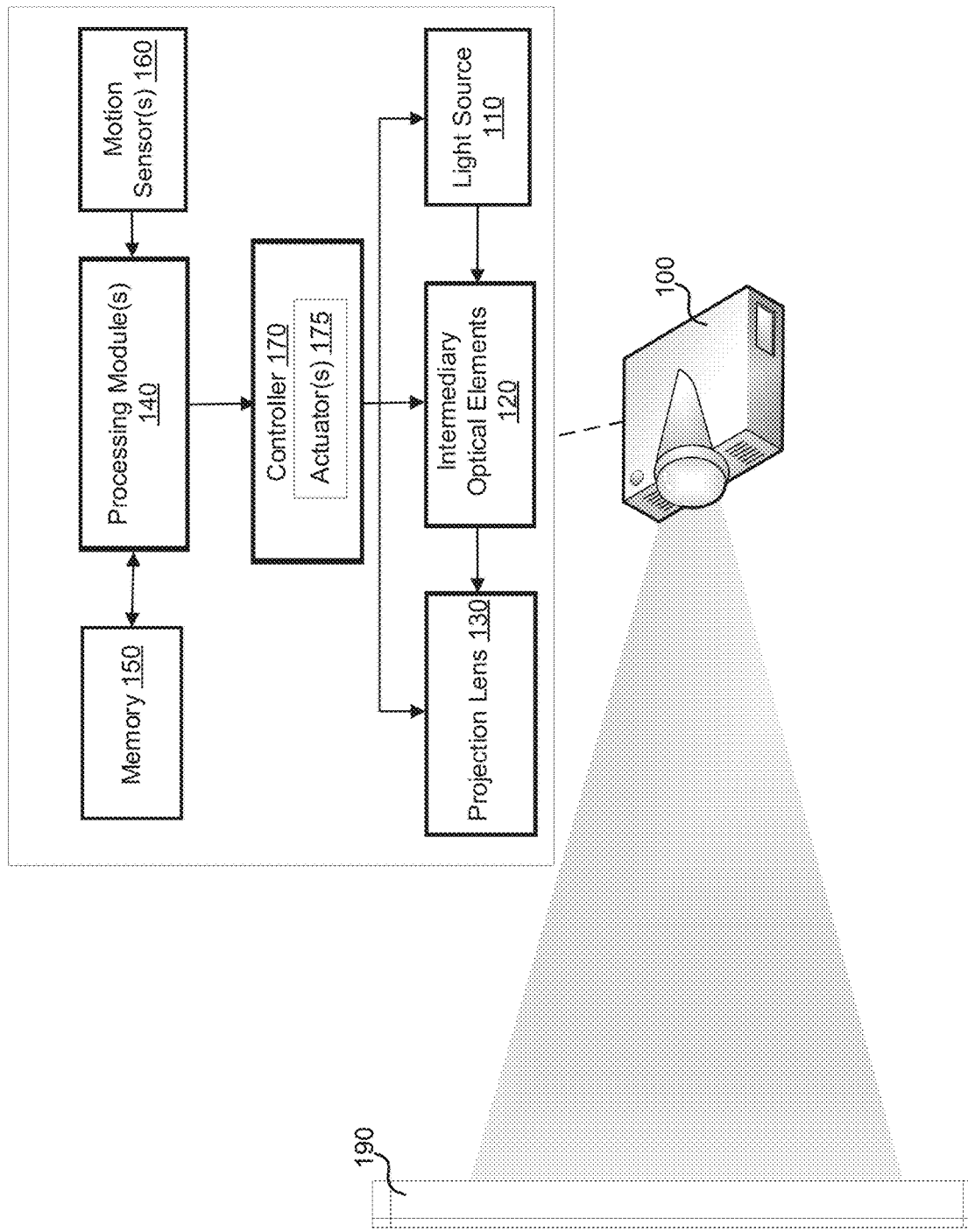
FIG. 1 illustrates an example system including a projector with which embodiments of the disclosure may be implemented.

The figures are not exhaustive and do not limit the disclosure to the precise form disclosed.

DETAILED DESCRIPTION

Video projectors act to amplify vibrations due to an effect of the lens spreading light from a small aperture to a much larger surface. Because the screen area where a projector projects may be many times larger than a projector's emission surface, vibrations may be proportionally magnified in the projected image as well.

The above problem is particularly noticeable when a projector is required to operate in settings with many sources of vibration such as stage performances, theme parks, movie sets, and the like. For example, vehicles used in theme parks and stages, and wenches used to hoist different props on stage may be necessary components of a stage performance, movie production, or theme park ride, but may also introduce significant sources of noise that cause vibration of an active projector. When the display device undergoes displacement, the vibration of the image projected by the projector may be particularly noticeable. In such settings, the vibrational problem generally cannot be solved by moving the projector to a different location or operating the projector when there is no noise or other source of vibration. Rather, it may be necessary to operate the projector with these sources of vibration present.

Present methods for addressing this method focus on mechanically mounting and isolating the projector in such a manner that limits the transfer of forces to the projector that induce displacement of the projector from equilibrium and destabilization of the projected image. For example, present methods may focus on isolating the projector from vibrational sources such as noise, temperature gradients, etc. Such methods may introduce expenses and construction. For example, a projector may need to be equipped with vibration isolators to prevent forces that induce vibration from reaching the projector.

To this end, the disclosure describes improved systems and methods for eliminating or mitigating vibrations or other unwanted movements introduced into a projector. In accordance with one set of implementations, an image projected by a projector may be stabilized by using an image stabilization system that detects a displacement of the projector and actuates an optical element of the projector to offset the displacement.

In accordance with an additional set of implementations, an image projected by the projector may be stabilized by using an image stabilization system that measures a rate of displacement from equilibrium of an image projected by the projector to predict a displacement of the projector and counteract the predicted displacement. In these implementations, a method may include: measuring the rate of displacement, using at the least the measured rate of displacement, estimating an actuation of an optical element of the projector required to maintain a stable image, and actuating the optical element.

In accordance with another set of implementations, an image projected by a projector may be stabilized by precalculating a plurality of lookup tables that correct for displacements of the projected image during operation of the projector. After precalculating the plurality of lookup tables, the projector's image may be stabilized during operation by detecting displacement from equilibrium of the image projected by the projector, and applying one of the plurality of precalculated lookup tables to the projected image to correct for displacement. These and other implementations are further described below.

FIG. 1 illustrates an example system including a projector 100 with which embodiments of the disclosure may be implemented. As illustrated, projector 100 uses a projection lens 130 to project an image onto projection surface 190 during operation. For example, projection surface 190 may be a screen, a wall, a floor, an object surface, or some other surface onto which an image is projected. Projector 100 may be any suitable projector for the environment, such as, for example, a digital light processing (DLP) projector, a liquid crystal on silicon (LCoS) projector, a liquid crystal display (LCD) projector, a laser scanning projector, or other projector.

Figure 2:
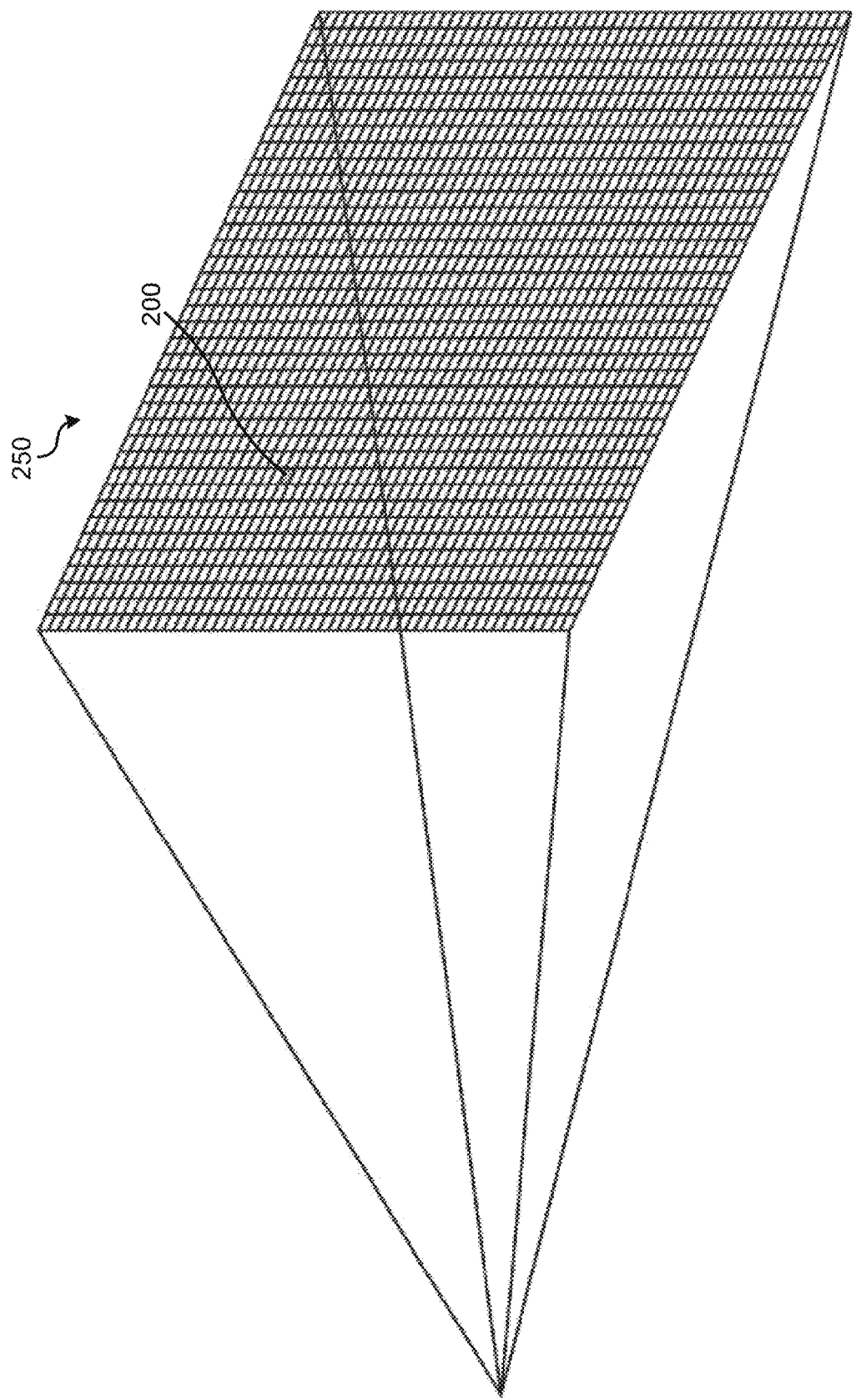
FIG. 2 illustrates an individual picture element of an image projected by a projector before displacement of the projector.
Figure 3:
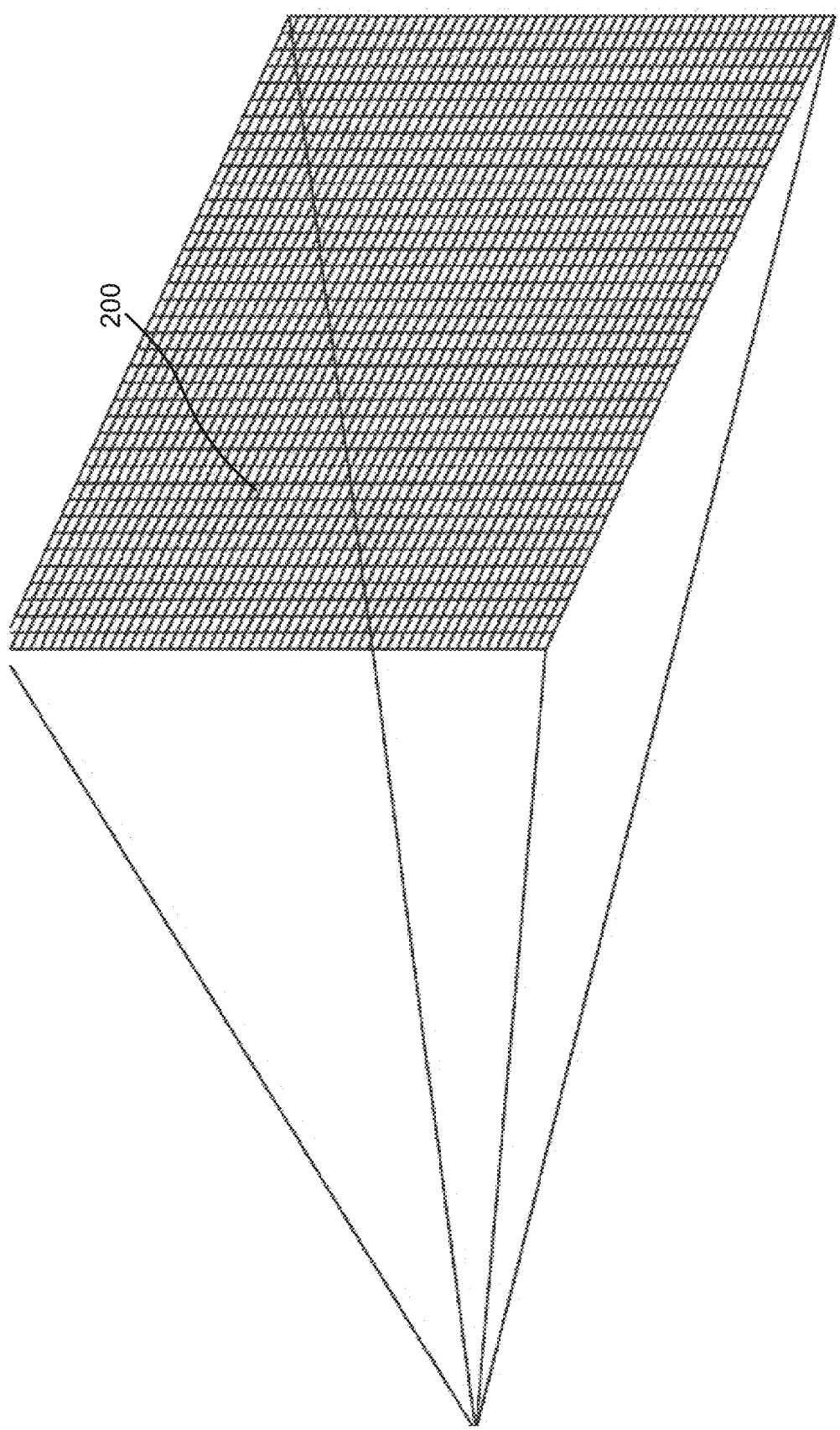
FIG. 3 illustrates the individual picture element of FIG. 2 after displacement.
Figure 4:
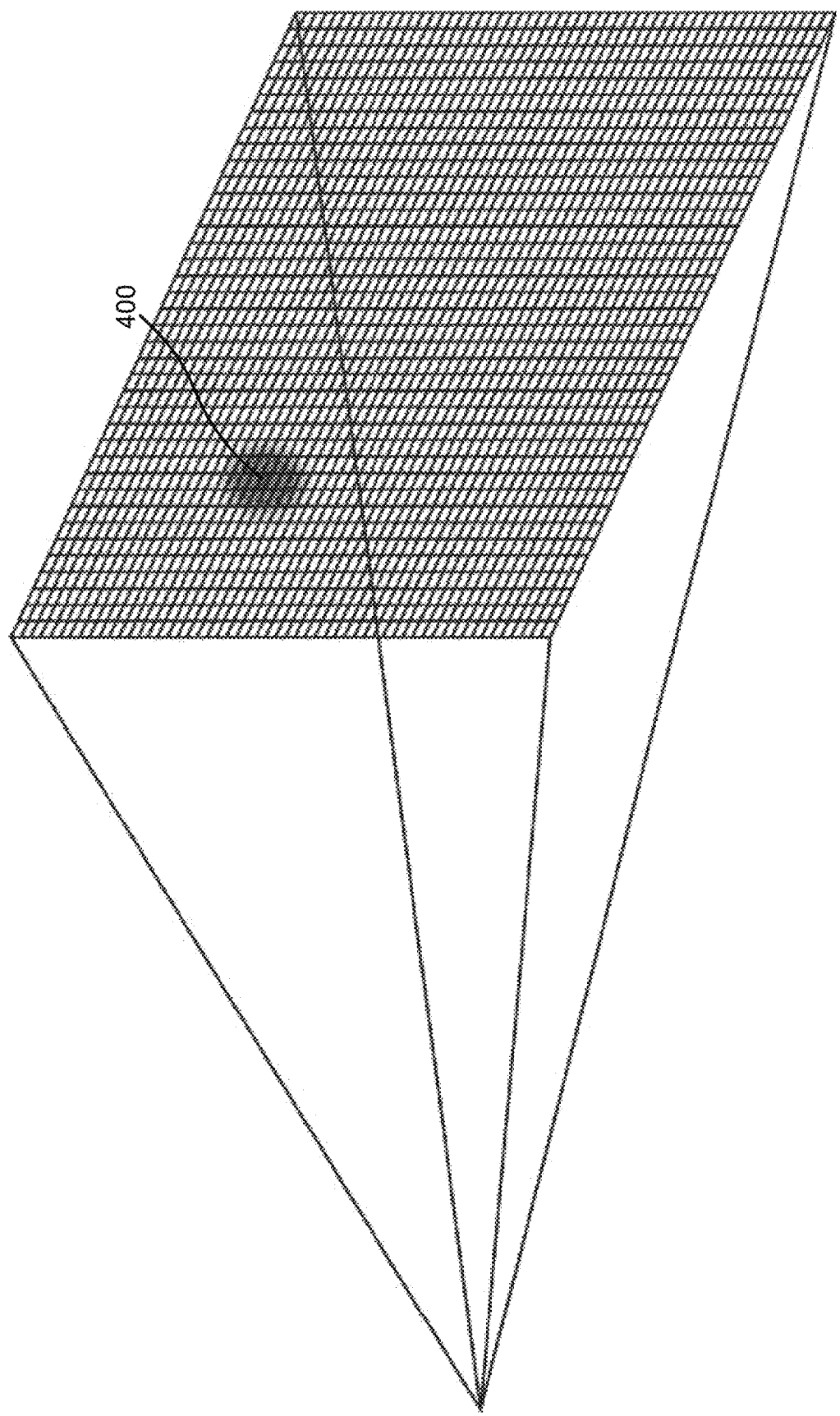
FIG. 4 illustrates the expected range of displacement of the picture element of FIG. 2 during operation of the projector, where the expected range is illustrated as a gray area varying in intensity.

Projector 100 may operate in an environment that includes forces that displace the projector 100 from equilibrium, thereby inducing vibrations that may displace the image projected by projector 100. This is illustrated by FIGS. 2-4, which show the potential displacement of a projected individual picture element 200 (e.g. a pixel) of a projected image 250 from vibration of projector 100. FIG. 2 shows the individual picture element before displacement. FIG. 3 shows the individual picture element 200 after it is displaced by movement. FIG. 4 shows a gray area 400 varying in intensity that depicts the expected displacement of picture element 200 due to vibration or some other movement of projector 100. As would be appreciated from the foregoing illustrations, in addition to causing the projected image to move, vibrations or other displacements of the projected image may also cause the projected image to appear blurry to a human viewer.

In accordance with implementations, further described below, projector 100 may be configured to prevent or correct image displacement during projection (i.e., "stabilize" the projected image). As illustrated, projector 100 may include: a light source 110, one or more intermediary optical elements 120, a projection lens 130, one or more processing module(s) 140, a memory 150, one or more motion sensor(s) 160, and a controller 170 to control one or more actuators 175. Projector 100 may also include an input (not shown) for receiving a digital source signal (e.g., a digital image or video to be projected).

Light source 110 may comprise one or more of an incandescent light source (e.g., an ultra-high pressure lamp), a light emitting diode (LED), a laser, or other suitable light source. Intermediary optical elements 120 may be configured to structure light emitted by the light source to create an image. For example, in the case of a single-chip DLP projector, intermediary optical elements 120 may include: optical elements to route the light (e.g., mirrors), a rotating color wheel, and a digital micromirror device (DMD) chip comprising a matrix (e.g., microarray) of movable mirrors to reflect light. For example, each of the movable mirrors may correspond to a pixel of a projected image. In the case of a three-chip DLP projector, intermediary optical elements 120 may include: optical elements to route the light, an optical element to split light into three primary colors (e.g., dichroic mirrors or prism), three DMD chips, each configured to receive a respective color of light (e.g., red, green, and blue), and an optical element for recombining the output of each of the DMD chips.

As another example, in the case of an LCD projector, intermediary optical elements 120 may include optical elements such as mirrors to route the light, optical elements to split light into three primary colors (e.g., dichroic mirrors or prism), three transmissive LCD panels or displays (e.g., plurality of optical cells or pixels including polarizing filters and liquid crystal layer) to receive a respective color component (e.g., red, green, or blue) of an image signal, a light recombiner (e.g., a dichroic prism to recombine light from the LCD panels), and other elements.

As a further example, in the case of an LCoS projector, intermediary optical elements 120 may include optical elements to route the light, optical elements to split light into three primary colors (e.g., dichroic mirrors or prism), three reflective LCoS microdevices (e.g., liquid crystal layer between thin-film transistor and silicon semiconductor) to receive a respective color component (e.g., red, green, or blue) of an image signal, a light recombiner, and other elements.

Projection lens 130 may collect and focus light from intermediary optical elements 120 to project an image on a surface 190. For example, in the case of a DLP projector, projection lens 130 may project and focus light from a DMD chip or recombined light from three DMD chips onto a projection surface. As another example, in the case of an LCD projector, projection lens 130 may project and focus recombined light from three LCD panels onto a projection surface.

Processing module(s) 140 may comprise circuitry for decoding a digital source signal (e.g., a digital video), circuitry for processing signals received from one or more motion sensor(s) 160, and/or circuitry for controlling optical components of the projector to project an image based on a received source signal and signals received from motion sensor(s) 160.

One or more processing module(s) 140, motion sensor(s) 160 and actuator(s) 175 may be components of an image stabilization system of projector 100. Motion sensor(s) 160 may generate electronic signals representative of the motion or position of projector 100. These electronic input signals may be received and processed by circuitry of a processing module 140 during operation to determine an absolute orientation the projector, determine an amount of displacement from the equilibrium position of the projector (i.e., position where there are no vibrations/movement), and/or determine a rate of displacement of the projector. In implementations, the one or more motion sensor(s) may measure displacement along three axes (e.g., pitch, yaw, and roll directions). In various implementations, motion sensor 160 may comprise one or more gyroscopes, accelerometers, and magnetometers that may operate in one or more axes. For example, motion sensor(s) 160 may comprise a 3-axis accelerometer. The motion sensors 160 may be mounted on a projector housing, surfaces of the projector containing the light path, and/or some other suitable location for measuring an amount of displacement or rate of displacement of the projected image.

Actuators 175 may comprise motors, microelectromechanical system (MEMS) actuators, piezoelectric actuators, translation stages, or some other actuator that may actuate (e.g., translate or rotate) or otherwise configure an optical element of projector 100 in one or more axes to correct for or prevent image displacement. In some cases, actuators 175 may be components that control the positioning or configuration of optical elements of projector 100 to project an image when image stabilization is not applied. In such cases, actuators 175 may be configured to apply a modified control of the optical elements (e.g., one taking into account the displacement of a projected image) when image stabilization is applied.

Memory 150 may comprise volatile memory (e.g. RAM), non-volatile memory (e.g. flash storage), or some combination thereof. In various implementations, memory 150 may store machine readable instructions, that when executed by a processing module 140 (e.g., a digital signal processor), cause projector 100 to correct for or prevent image displacement during projection. For example, execution of the machine readable instructions may cause processing module(s) 140 to process readouts by motion sensors 160 to determine a total amount of displacement from equilibrium in one or more axes (e.g., 3 axes) and/or determine a rate of displacement in one or more axes (e.g., 3 axes). Additionally, execution of the machine readable instructions may cause processing module(s) to cause controller 170 to send one or more control signals to actuator(s) 175 to actuate one or more optical elements of the projector to correct for or prevent image displacement based on the processed readouts by motion sensors 160. Memory 150 may also store a history of processed motion sensor readouts (e.g., displacement and rate of displacement data) and/or lookup tables that may be used to correct for displacement during projection.

Figure 5:
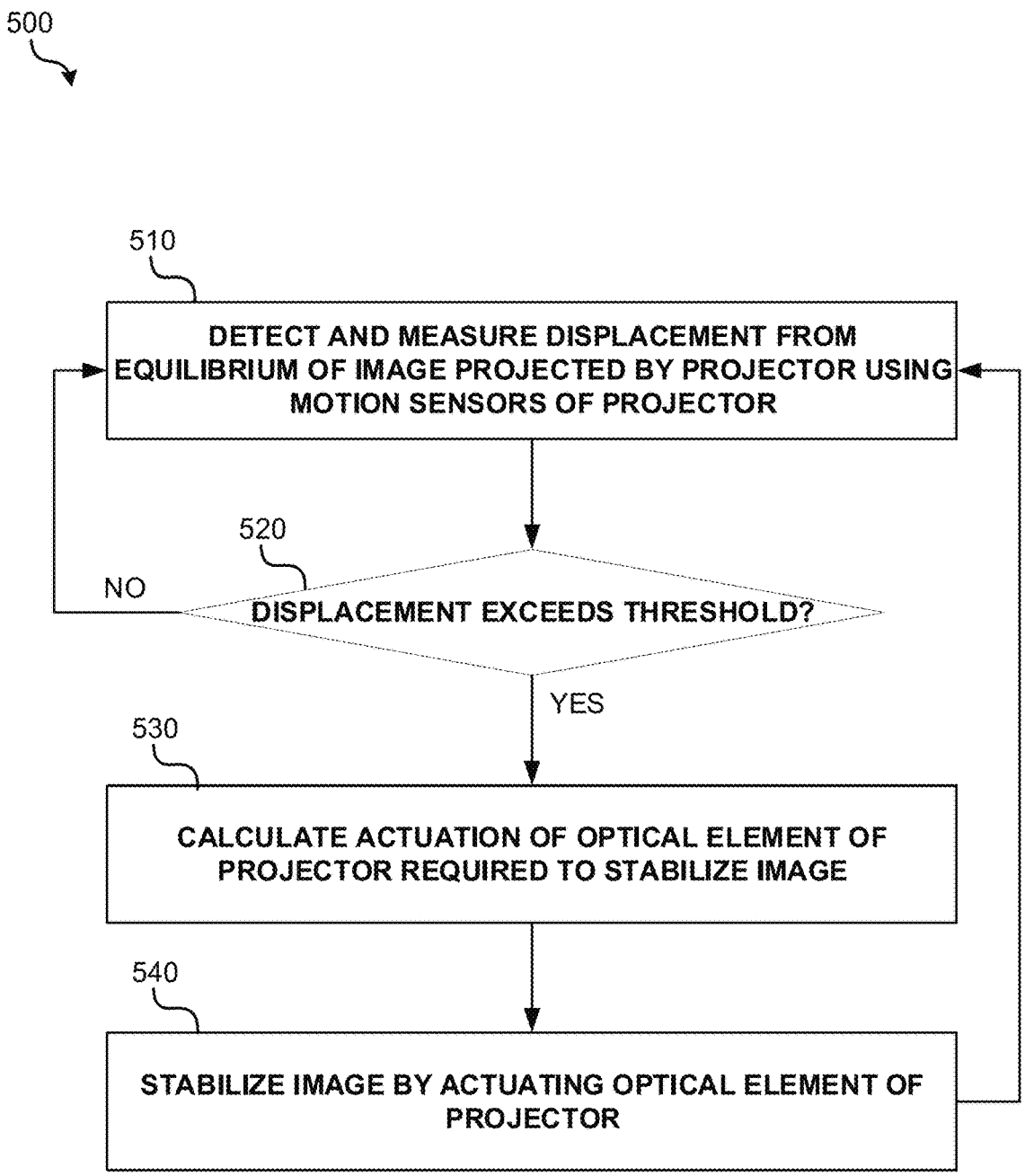
FIG. 5 is an operational flow diagram illustrating an example pixel-shifting method to stabilize an image projected by a projector by offsetting the projected image depending on a detected displacement of the projector.

FIG. 5 is an operational flow diagram illustrating an example pixel-shifting method 500 to stabilize an image projected by a projector by offsetting the projected image depending on a detected displacement of the projector. For example, method 500 may be implemented to counteract the effects of vibration on a projector 100 by using an image stabilization system including one or more processing module(s) 140, motion sensor(s) 160, controller 170, and/or actuator(s) 175.

Figure 6:
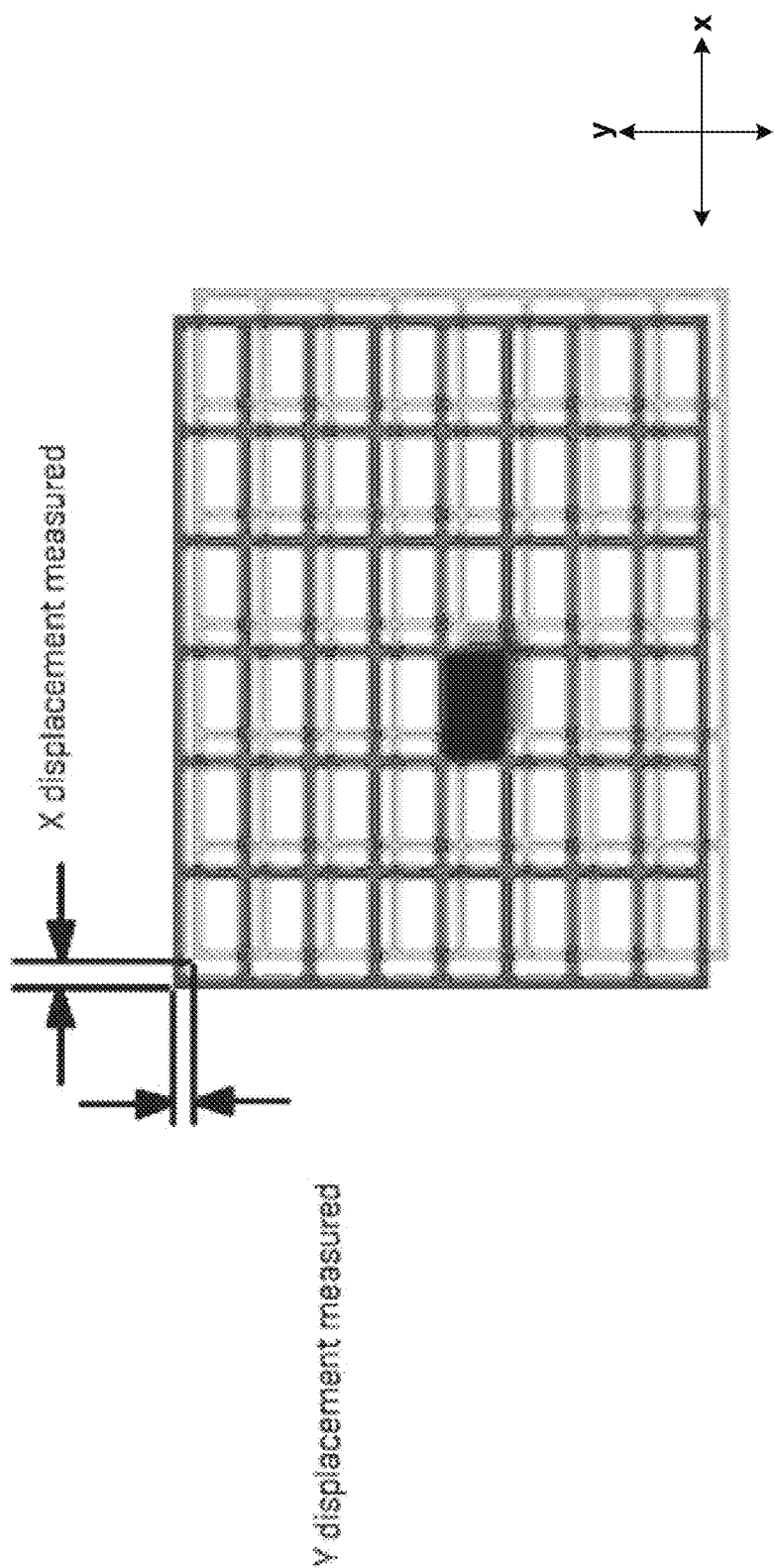
FIG. 6 shows Y-axis and X-axis displacement of a projected image that may occur during operation of a projector.

At operation 510, one or more motion sensors of a projector are used to detect and measure a displacement from equilibrium of an image projected by the projector. In implementations, a reference equilibrium position of the projector may be established by the one or more motion sensors (e.g., sensors 160) when there are no vibrations or other forces that cause movement of the projector. The displacement may be detected in one axis, two axes, or three axes. By way of illustrative example, FIG. 6 shows both a Y-axis and X-axis displacement of a projected image that may occur during operation of the projector. In example FIG. 6, the shaded black picture element shows a displaced picture element and the shaded gray picture element in the background shows the desired position of the picture element. In implementations, a displacement detected by a motion sensor such as an accelerometer may be converted to a corresponding pixel displacement (e.g., ½ pixel, 1 pixel, 2 pixels, 4 pixels, etc.) using a precomputed mapping between motion sensor detected displacement and corresponding pixel displacement.

At decision 520, it is determined whether the measured displacement exceeds a predetermined threshold. For example, in some implementations it may not be necessary to correct for the displacement if it is not perceptible by the human eye (e.g., does not introduce a perceptible blur or movement of the projected image). In some implementations, a predetermined threshold may be compared to the measured displacement in each of multiple directions (e.g., x direction and y direction). Additionally, in some implementations, the threshold may be configured as the smallest displacement an image stabilization system of the projector can correct. In alternative implementations, decision 520 may be skipped.

At operation 530, based on the measured displacement, a processing system or unit of the projector may calculate an actuation or configuration of an optical element of the projector necessary to stabilize the projected image (e.g., to counteract the displacement). At operation 540, the projected image may be stabilized by actuating or configuring the optical element of the projector to alter or reinterpret an optical path in the projector (e.g., in pitch, yaw, and roll directions) based on the calculated actuation or configuration. For example, if a displacement of +2 pixels in the x-axis and −3 pixels in the y-axis is detected, the projected image may be displaced −2 pixels in the x-axis and +3 pixels in the y-axis.

In some implementations, the projected image may be stabilized by using an actuator to actuate the projections lens (e.g. projection lens 130) of the projector to cancel movement of the projected image. In other implementations, an intermediary optical element (e.g., element 120) of the projector may be actuated. For example, in the case of a DLP projector, the mirrors of one or more DMD chips may be moved to change the angle at which light is reflected. In the case of an LCD projector or LCoS projector, the LCD panels or LCoS panels may be translated. In other implementations, the optical path of some other element of the projector may be varied to compensate for projector movement.

Figure 7:
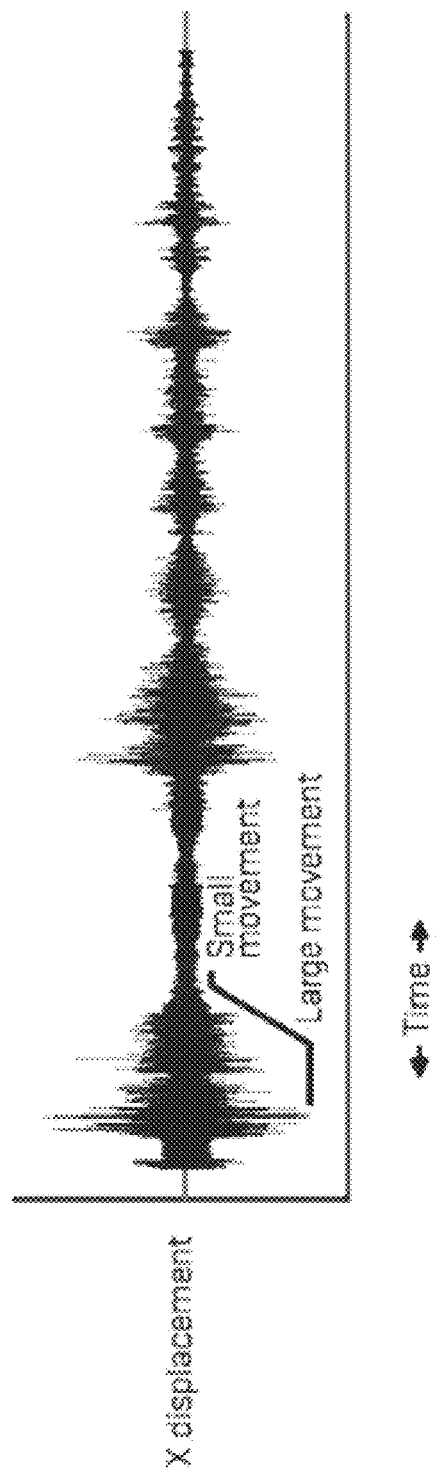
FIG. 7 is a graph depicting the displacement of a projector's housing in one dimension as a function of time in response to vibrations.

Method 500 may be iteratively repeated to dynamically compensate for time-varying displacements (e.g., varying vibrations) to maintain a stable image. For example, as illustrated by FIG. 7, which is a graph depicting the displacement of a projector's housing in one dimension as a function of time, there may be significant variations in the displacement over time. In implementations, the rate at which method 500 is repeated may exceed a predetermined threshold. For example, the threshold may exceed a frame rate of a projected video and/or a rate at which the stabilization becomes imperceptible to the human eye.

In particular implementations where the projector displays video, optical-flow analysis may be utilized to generate interframe-displacement images if the projector is capable of displaying video frames at a higher rate than the frame rate of the video (e.g. 24 FPS). In such implementations, each video frame may be displaced/repositioned one or more times at a rate higher than the video's frame rate (and thus displayed two or more times) without changing the desired temporal appearance of the video. For example, each video frame may be displaced at a rate that is some multiple n of the frame rate of the video, where n>1 and is an integer.

Figure 8:
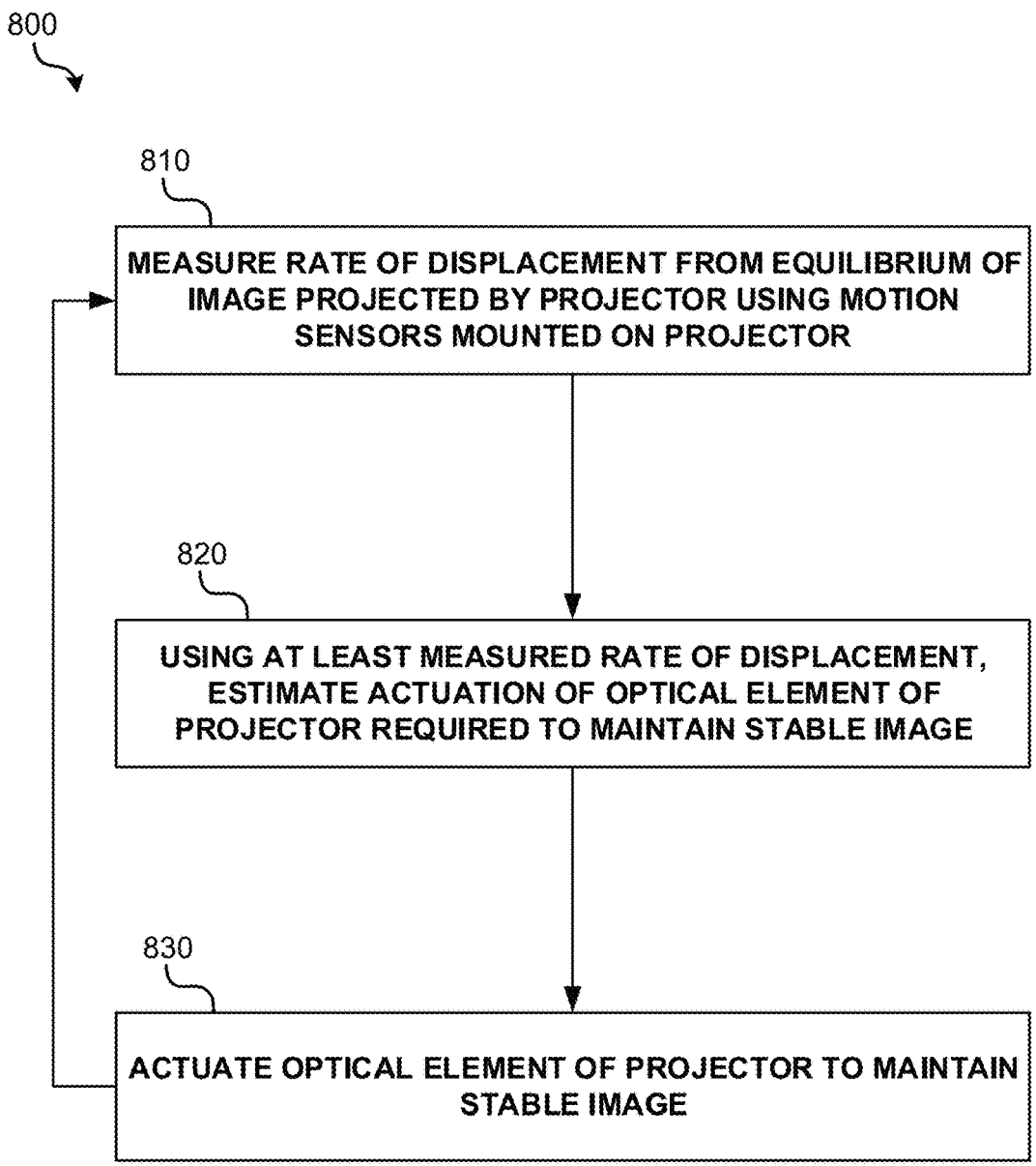
FIG. 8 is an operational flow diagram illustrating an example pixel-shifting method to stabilize an image projected by a projector by offsetting the projected image using a predicted displacement based on a measured rate of displacement of the projected image.

In some implementations, image stabilization of the projector may be achieved by predicting the displacement of the projected image based on a rate of change of the displacement (e.g., magnitude and direction of displacement), and counteracting the predicted displacement. FIG. 8 is an operational flow diagram illustrating one such example method 800. In particular, FIG. 8 illustrates an example pixel-shifting method to stabilize an image projected by a projector by offsetting the projected image using a predicted displacement based on a measured rate of displacement of the projected image. For example, method 800 may be implemented to counteract the effects of vibration on a projector 100 by using an image stabilization system including one or more processing module(s) 140, motion sensor(s) 160, controller 170, and/or actuator(s) 175.

At operation 810, one or more motion sensors of a projector are used to measure a rate of displacement from equilibrium of an image projected by the projector. In implementations, a reference equilibrium position of the projector may be established by the one or more motion sensors (e.g., sensors 160) when there are no vibrations or other forces that cause movement of the projector. The rate of displacement may be detected in one axis, two axes, or three axes, and may include a magnitude and direction of displacement from equilibrium. In implementations, a rate of displacement detected by a motion sensor such as an accelerometer may be converted to a corresponding pixel rate of displacement (e.g., ½ pixel/second, 1 pixel/second, 2 pixels/second, 4 pixels/second, etc.) using a precomputed mapping between motion sensor detected displacement and corresponding pixel displacement.

Figure 9:
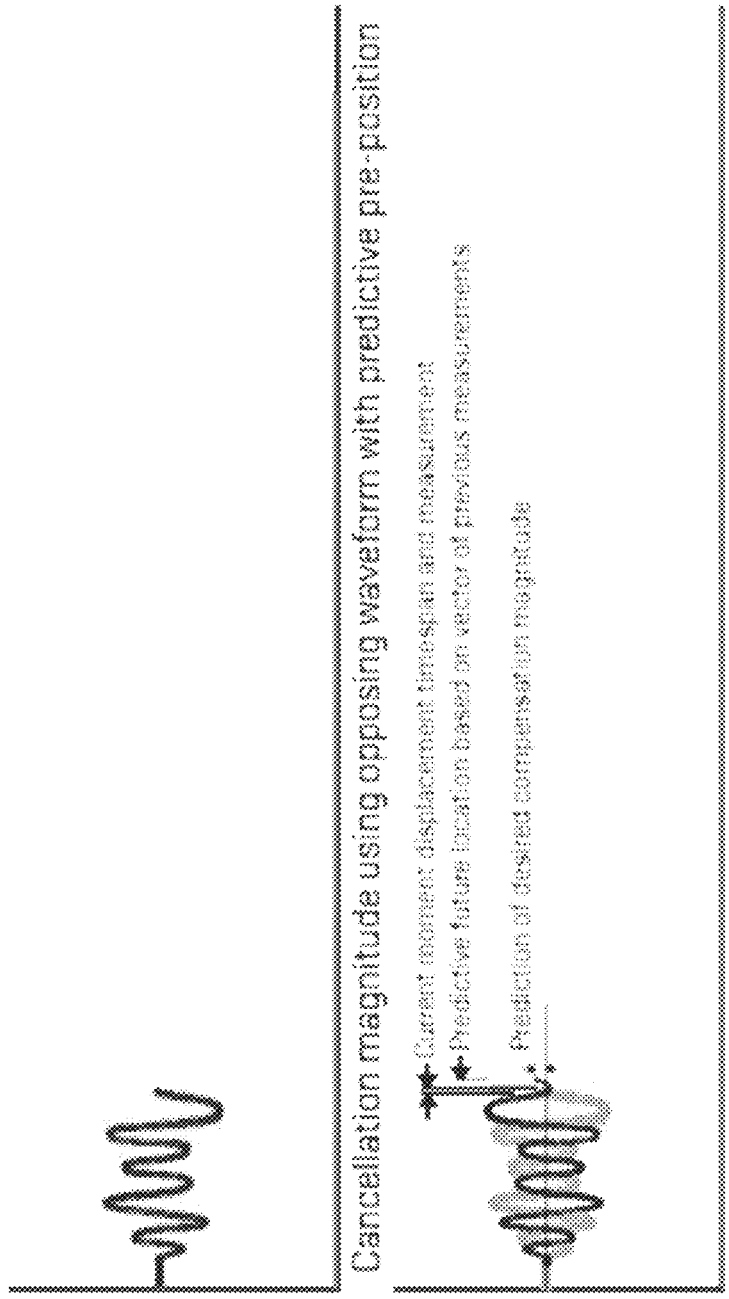
FIG. 9 shows a first plot depicting one-axis movement of a projected image from equilibrium as a function time, and a second plot depicting one-axis predicted cancellation movement of the projected image as a function of time.

At operation 820, using at least the measured rate of displacement a processing system or unit of the projector may estimate an actuation or configuration of an optical element of the projector necessary to maintain a stable projected image (e.g., to counteract the predicted displacement). By way of illustrative example, FIG. 9, shows a first plot depicting stepwise, one-axis movement of a projected image from equilibrium as a function time, and a second plot depicting stepwise, one-axis predicted cancellation movement of the projected image as a function of time. Movement of the projector may be sampled at a sufficient rate such that a cancellation movement may be reliably predicted.

At operation 830, the optical element may be actuated or configured based on the estimated actuation to maintain a stable image. For example, as discussed above, a projection lens of the projector may be actuated, the mirrors of one or more DMD chips of a DLP projector may be moved to change the angle at which light is reflected, the LCD panels of an LCD projector may be reconfigured, or the LCoS panels of an LCoS projector may be reconfigured.

Although methods 500 and 800 have so far been described as separate methods for stabilizing an image projected by a projector, in some implementations, the techniques of methods 500 and 800 may be combined. By way of example, the measured displacement position from equilibrium along with the measured rate of displacement (e.g., magnitude and direction) may both be considered in estimating an actuation of an optical element needed to stabilize the projected image and/or maintain a stable projected image.

In some implementations, it may be advantageous to precalculate the possible range of displacements of a projector during operation, and create a set of lookup tables (LUTs) to correct for displacements within the range of displacements. For example, each LUT may map the set of pixels of a video frame from a first position to a second position depending on a measured displacement. In many cases, a projector may operate in an environment that repeatedly subjects it to the same or similar vibrational forces. For instance, consider a projector that is mounted on a wall near a track of a theme park ride. In this instance, the projector may repeatedly experience the same or similar vibrational forces as vehicles running on the track approach and pass the projector. This may significantly limit the range or number of compensations that are needed to be precalculated to correct for image displacement. By measuring the displacements during one or more of these events, a plurality of lookup tables may be precalculated that account for all of the vibrational forces the projector generally experiences. Additionally, even if the vibrations of the environment are not consistent, a projector may not move inadvertently in an unlimited range, which in itself may limit the number of compensations needed to be precalculated.

Figure 10:
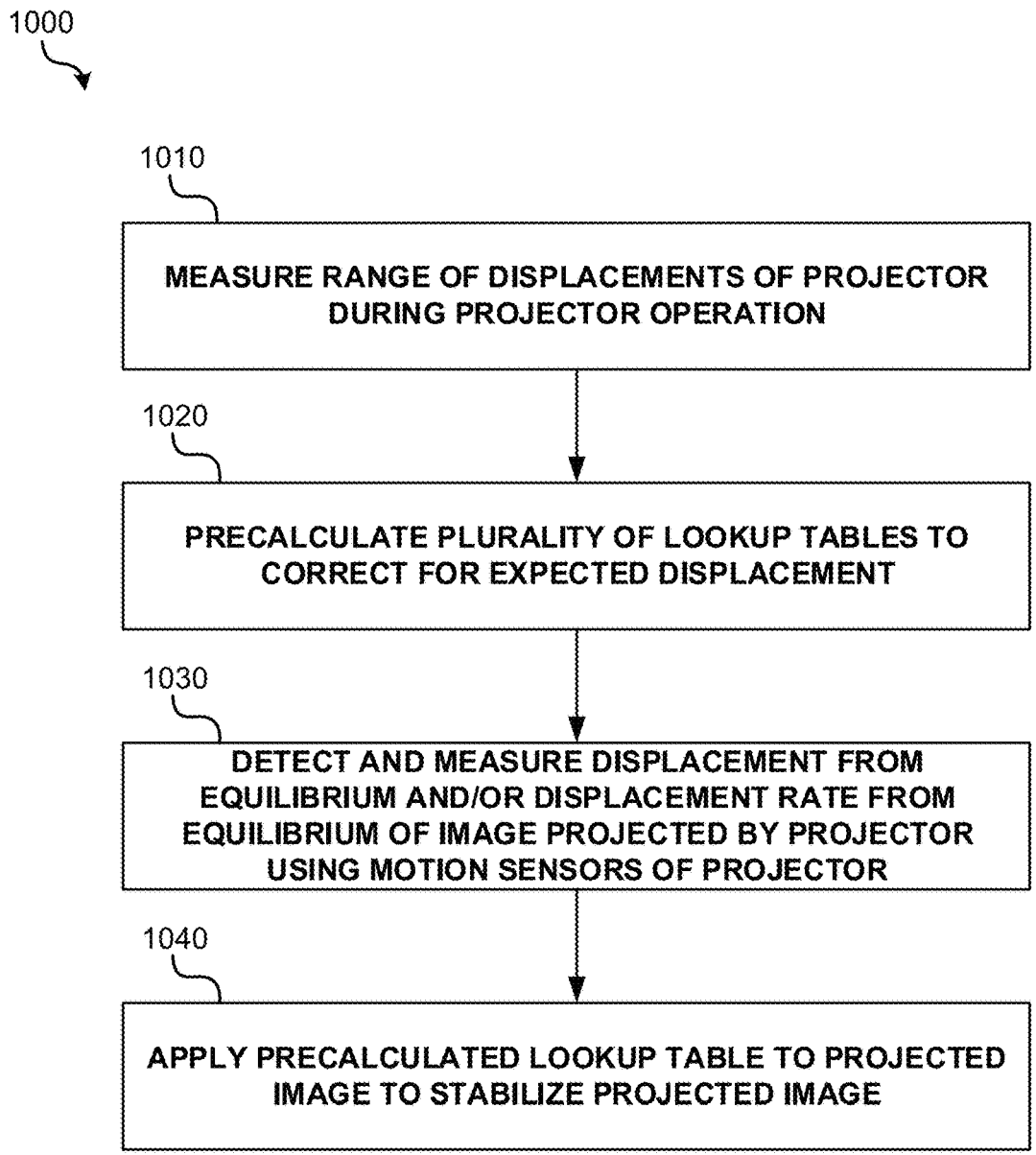
FIG. 10 is an operational flow diagram illustrating an example method to stabilize a projected image by precalculating a plurality of lookup tables that correct for image displacements of the projector during operation.

FIG. 10 is an operational flow diagram illustrating one such example method 1000 to stabilize a projected image by precalculating a plurality of LUTs that correct for image displacements of the projector during operation. For example, method 1000 may be implemented to counteract the effects of vibration of a projector 100 by using an image stabilization system including one or more processing module(s) 140, motion sensor(s) 160, controller 170, and/or actuator(s) 175.

Figure 11:
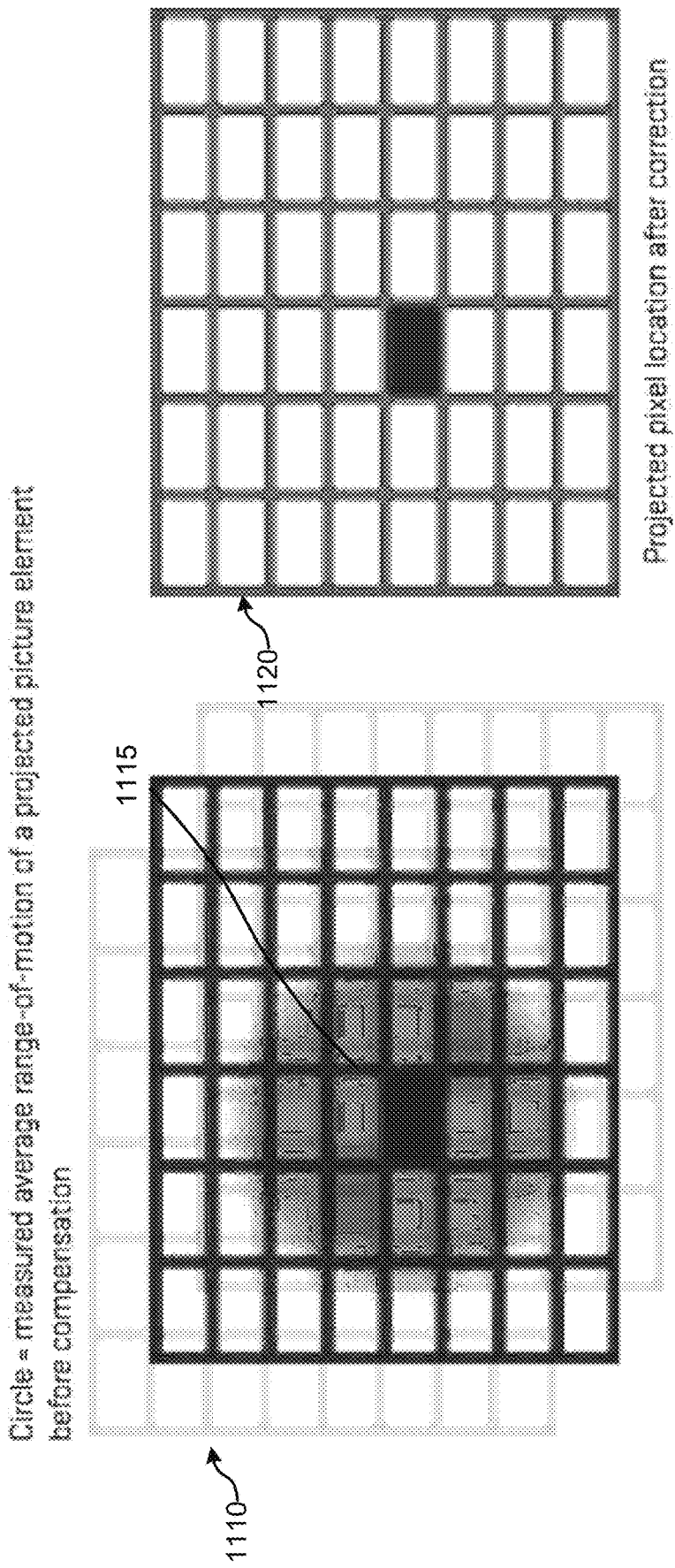
FIG. 11 shows a measured average range-of-motion of a projected picture element before compensation and after compensation.

At operation 1010, a range of displacements of the projector during projector operation may be measured. These displacements may be measured in one axis, two axes, or three axes using one or motion sensors (e.g., motion sensor(s) 160). By way of illustrative example, FIG. 11 shows a measured average range-of-motion of a projected picture element before compensation (scenario 1110) and after compensation (scenario 1120). In this example, a gray area 1115 varying in intensity depicts the measured displacement of the picture element due to vibration or some other movement.

At operation 1020, using the measured range of displacements, a plurality of LUTs may be precalculated, where each LUT may calculated to correct for a displacement or range of displacements of the projected image in one or more dimensions. For example, each LUT may contain an array of values such as floating point numbers representing a displacement correction for each of the pixels of the projected image for a measured displacement of the image. In implementations, each LUT may contain a single correction that is applied to the entire image (e.g., all pixels are displaced by the same value) or a multi-dimensional correction that applies different displacement corrections to different pixels depending on the positions of the projected pixel.

At operation 1030, displacement of a projected image during operation of the projector may be measured using one or more motion sensors. For example, the displacement from equilibrium and/or displacement rate from equilibrium may be measured as described above with reference to methods 500 and 800.

At operation 1040, based on the measured displacement and/or displacement rate, one or more of the plurality of precalculated LUTs may be applied to the projected image to stabilize the projected image. For example, the measured displacement and/or displacement rate may be compared to a displacement and/or a displacement rate (or displacement range and/or displacement rate range) of the LUTs, and a matching or most similar LUT may be used to stabilize the projected image. A graphical processing unit (GPU) or other processing unit of the projector may pre-read a LUT that is applied to a frame of a video source file before the video frame is projected.

Figure 12:
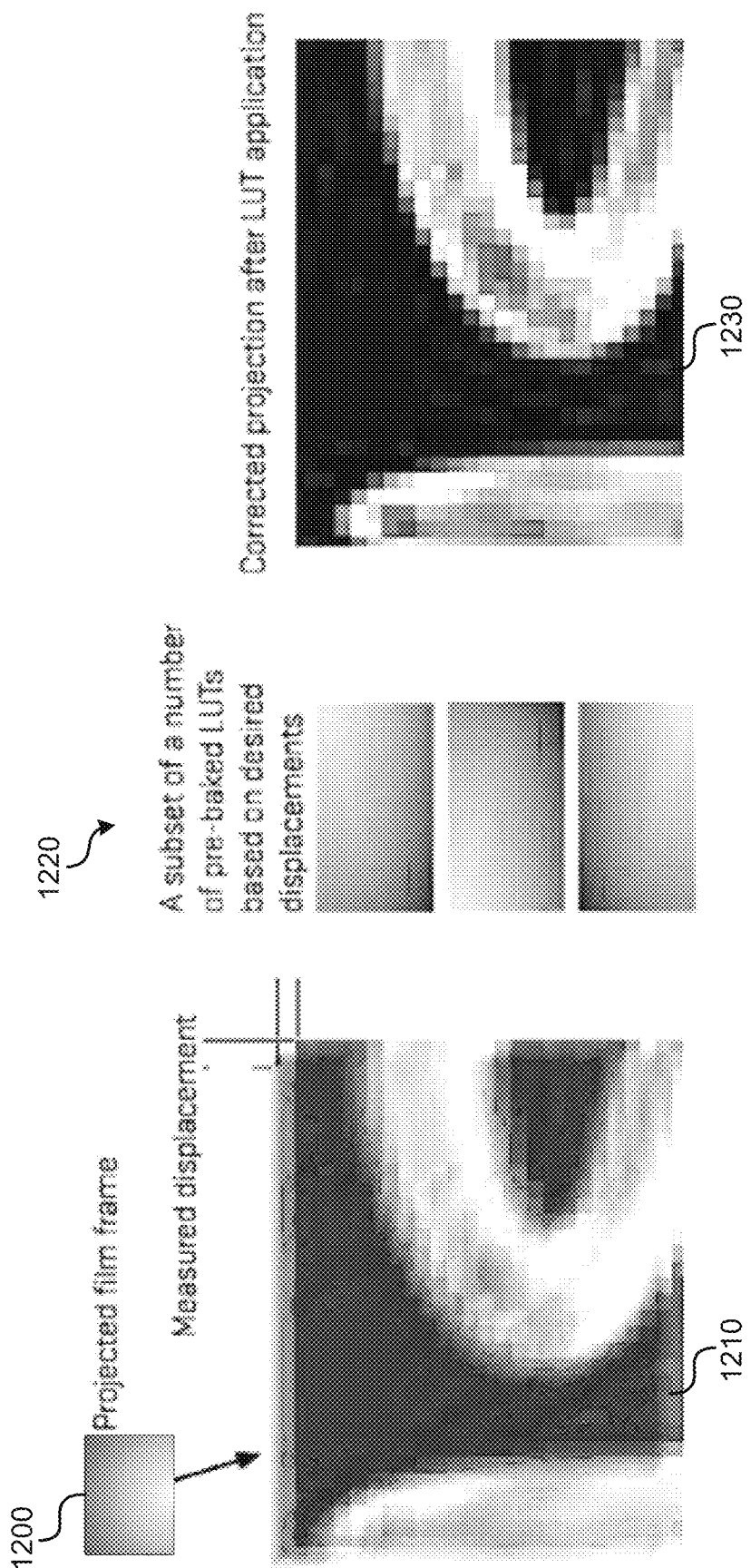
FIG. 12 illustrates a portion of a projected film frame as would be perceived by a viewer before correction, and a portion of the projected film frame as would be perceived by viewers after application of one or more precomputed LUTs.

By way of example, FIG. 12 illustrates a portion 1210 of a projected film frame 1200 as would be perceived by a viewer before correction, and a portion 1230 of the projected film frame as would be perceived by viewers after application of one or more precomputed LUTs 1220. As illustrated, the LUTs 1220 may be applied on a per-frame basis. Before correction, the projected film frame may appear blurred to a viewer, and displacement may be measured in two axes. Precomputed lookup tables 1220 that correct the measured displacement may result in a corrected frame.

Figure 13:
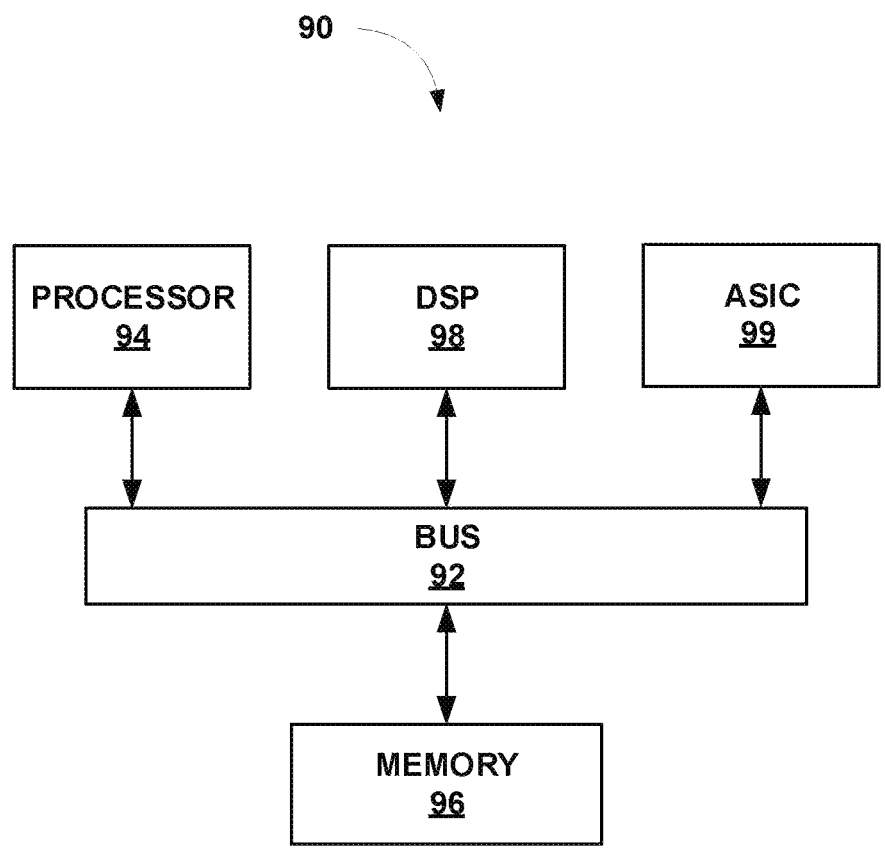
FIG. 13 illustrates a chip set/computing module 90 in which embodiments of the technology disclosed herein may be implemented.

FIG. 13 illustrates a chip set/computing module 90 in which embodiments of the technology disclosed herein may be implemented. Chip set 90 can include, for instance, processor, memory, and additional image components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 90 includes a communication mechanism such as a bus 92 for passing information among the components of the chip set 90. A processor 94, such as an image processor has connectivity to bus 92 to execute instructions and process information stored in a memory 96. A processor may include one or more processing cores with each core configured to perform independently. Alternatively or in addition, a processor may include one or more microprocessors configured in tandem via bus 92 to enable independent execution of instructions, pipelining, and multithreading. Processor 94 may also be accompanied with one or more specialized components to perform certain processing functions and tasks such as one or more digital signal processors, e.g., DSP 98, such as an OIS DSP, image sensor, OIS gyroscope, and/or one or more application-specific integrated circuits (ASIC) 99, such as that which can be utilized to, e.g., drive a MEMS actuator for achieving OIS, zoom, and/or AF functionality. DSP 98 can typically be configured to process real-world signals (e.g., sound) in real time independently of processor 94. Similarly, ASIC 99 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The aforementioned components have connectivity to memory 96 via bus 92. Memory 96 includes both dynamic memory (e.g., RAM) and static memory (e.g., ROM) for storing executable instructions that, when executed by processor 94, DSP 98, and/or ASIC 99, perform the process of example embodiments as described herein. Memory 96 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example-computing module 90. After reading this description, it will become apparent to a person skilled in the relevant art how to implement the application using other computing modules or architectures.

In this document, the terms "computer program medium" and "computer usable medium" are used to generally refer to non-transitory media such as, for example, memory 96, or other memory/storage units. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 90 to perform features or functions of the present application as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An image stabilization system, comprising:
   an optical element configured to project an image;
   one or more motion sensors configured to detect a motion of a projector;
   a processing element configured to determine a displacement rate of the projected image based on the motion of the projector; and
   an actuator configured to actuate the optical element to stabilize the projected image based on the displacement rate of the projected image.

2. The image stabilization system of claim 1, wherein the processing element is further configured to determine a total displacement of the projected image based on the motion of the projector detected by the one or more motion sensors, and the optical element is configured to be actuated based on the total displacement.

3. The image stabilization system of claim 2, wherein the optical element comprises a projection lens, wherein the actuator comprises a motor configured to actuate the projection lens to correct for the total displacement.

4. The image stabilization system of claim 2, further comprising the projector, wherein the projector is a digital light processing projector, wherein the optical element comprises a plurality of mirrors of a digital micromirror device chip, wherein the actuator is one of a plurality of actuators configured to actuate the plurality of mirrors to correct for the total displacement.

5. The image stabilization system of claim 2, further comprising the projector, wherein the projector is a liquid crystal display (LCD) projector, wherein the optical element comprises an LCD panel, wherein the actuator is configured to actuate the LCD panel to correct for the total displacement.

6. The image stabilization system of claim 2, further comprising the projector, wherein the projector comprises a liquid crystal on silicon (LCoS) projector, wherein the optical element comprises a LCoS microdevice, wherein the actuator is configured to actuate the LCoS microdevice to correct for the total displacement.

7. The image stabilization system of claim 1, further comprising a memory configured to store a lookup table associated with a map to correct a respective displacement or a displacement range of the projected image, wherein the processing element is further configured to determine an actuation of the optical element based on the map, and the actuator is further configured to actuate the optical element based on the actuation.

8. The image stabilization system of claim 1, further comprising the projector, wherein the optical element comprises a projection lens.

9. The image stabilization system of claim 1, wherein the image stabilization system is a three-axis image stabilization system, wherein the one or more motion sensors are further configured to measure displacement of the projected image in three axes.

10. The image stabilization system of claim 1, wherein the one or more motion sensors are further configured to measure the displacement rate of the projected image from an equilibrium position, and wherein the actuator is configured to actuate the optical element to correct for a predicted displacement of the projected image based on the displacement rate.

11. The image stabilization system of claim 1, wherein the one or more motion sensors are further configured to measure a total displacement and the displacement rate of the projected image from an equilibrium position, and wherein the actuator is configured to actuate the optical element to correct for a predicted displacement of the projected image based on the displacement rate and the total displacement.

12. The image stabilization system of claim 1, wherein:
   the projected image includes video projected at a frame rate; and
   the projector is configured to display interframe-displacement images at a second frame rate higher than the frame rate.

13. The image stabilization system of claim 12, wherein the interframe-displacement images are configured to be generated via optical-flow analysis.

14. The image stabilization system of claim 1, wherein the optical element is associated with a position in the projected image, and a correction is applied to the optical element to stabilize the projected image based on the position.

15. A method, comprising:
   projecting an image with a projector;
   while projecting the image, using one or more motions sensors, to detect a motion of the projector;
   determining a displacement rate of the projected image based on the motion of the projector;
   determining, using the displacement rate, an actuation of an optical element needed to stabilize the projected image; and
   stabilizing the projected image by actuating the optical element based on the determined actuation.

16. The method of claim 15, further comprising determining a total displacement of the projected image, wherein determining the actuation of the optical element comprises referencing a precalculated lookup table associated with a map to correct for the total displacement.

17. The method of claim 16, further comprising determining if the total displacement exceeds a predetermined threshold.

18. The method of claim 16, wherein determining the total displacement or the displacement rate comprises measuring a displacement of the projected image in three axes.

19. The method of claim 15, further comprising storing a plurality of lookup tables in a memory of the projector, each of the plurality of lookup tables being associated with a map to correct a respective displacement or a displacement range of the projected image.

20. The method of claim 15, wherein the optical element comprises a projection lens of the projector, and actuating the optical element comprises actuating the projection lens.

21. The method of claim 15, wherein the projector comprises a digital light processing projector, wherein the optical element comprises a plurality of mirrors of a digital micromirror device chip, and wherein actuating the optical element comprises actuating at least one mirror of the plurality of mirrors of the digital micromirror device chip.

22. The method of claim 15, wherein the projector comprises a liquid crystal display (LCD) projector, wherein the optical element comprises an LCD panel provided in the projector, and wherein actuating the optical element comprises actuating the LCD panel.

23. The method of claim 15, wherein the projector comprises a liquid crystal on silicon (LCoS) projector, wherein the optical element comprises a LCoS microdevice provided in the projector, and wherein actuating the optical element comprises actuating the LCoS microdevice.

24. The method of claim 15, further comprising:
measuring, using the one or more motions sensors, the displacement rate from an equilibrium positions, wherein determining the actuation of the optical element is based at least in part on the displacement rate.

25. The method of claim 15, wherein the projected image includes video projected at a frame rate, and
wherein the method further comprises displaying, using the projector, interframe-displacement images at a second frame rate higher than the frame rate.

* * * * *